S. HILL.
PLANTER.
APPLICATION FILED MAR. 29, 1915.
1,174,419.
Patented Mar. 7, 1916.
3 SHEETS—SHEET 1.
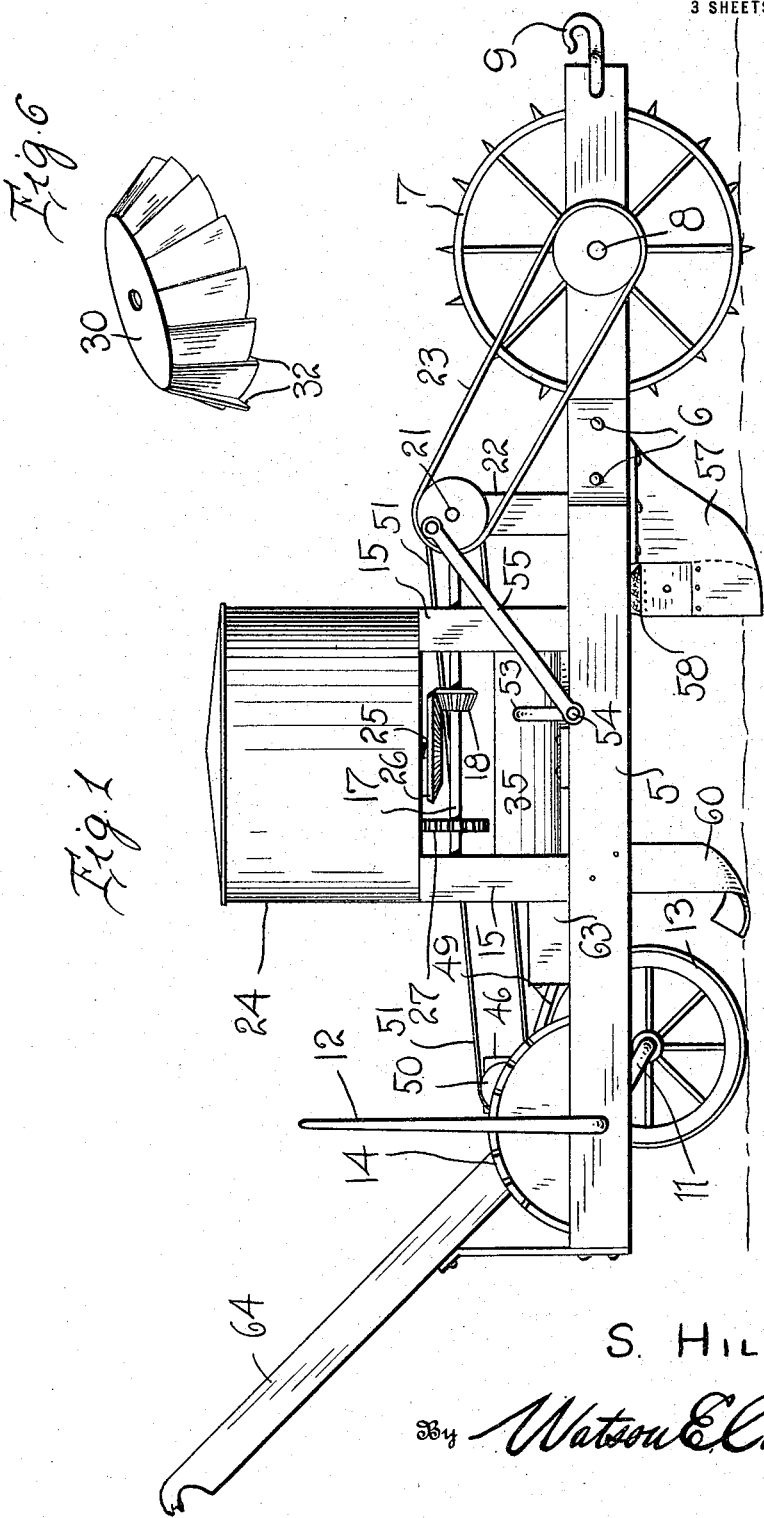
Inventor
S. Hill
By Watson E. Coleman
Attorney

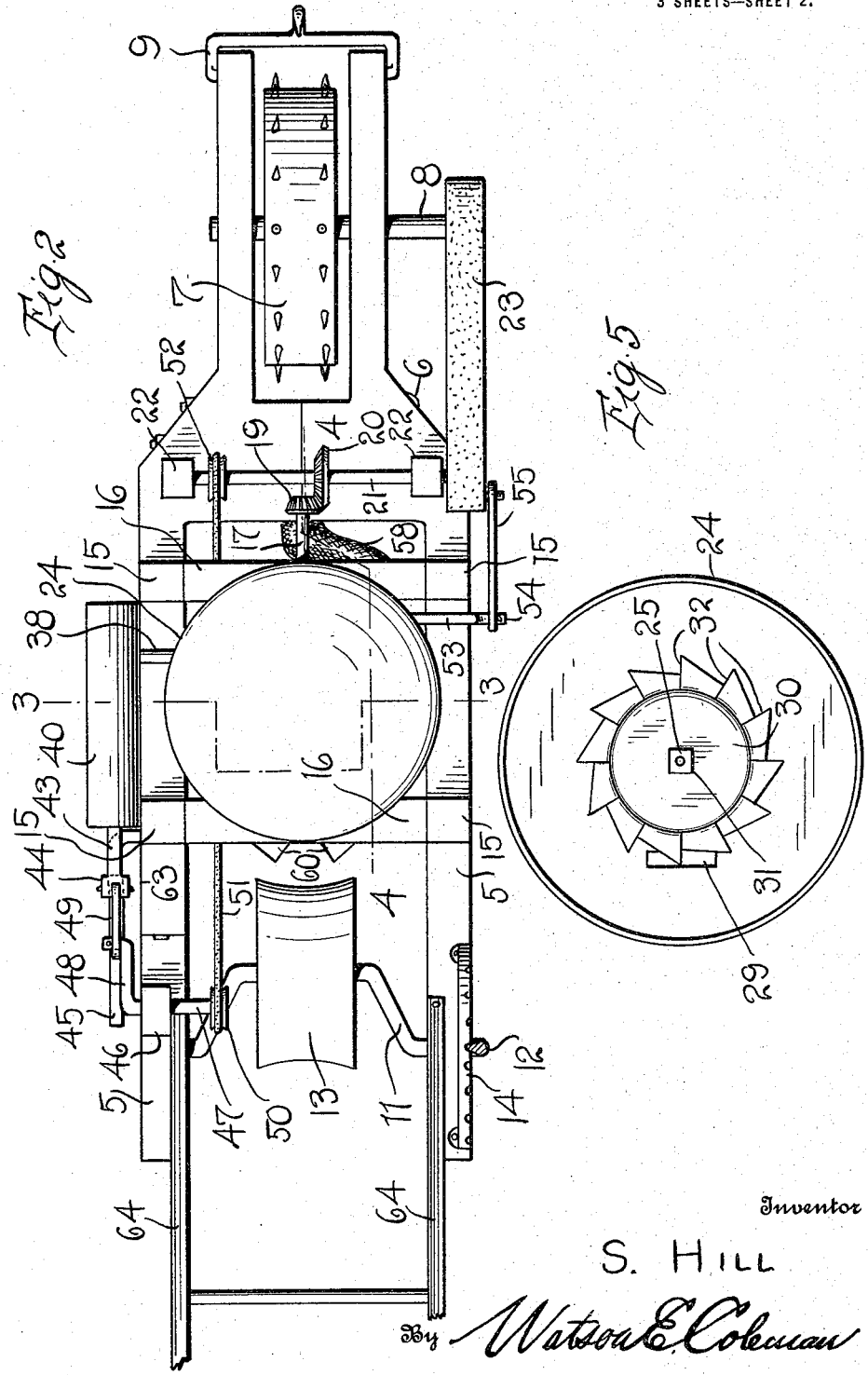

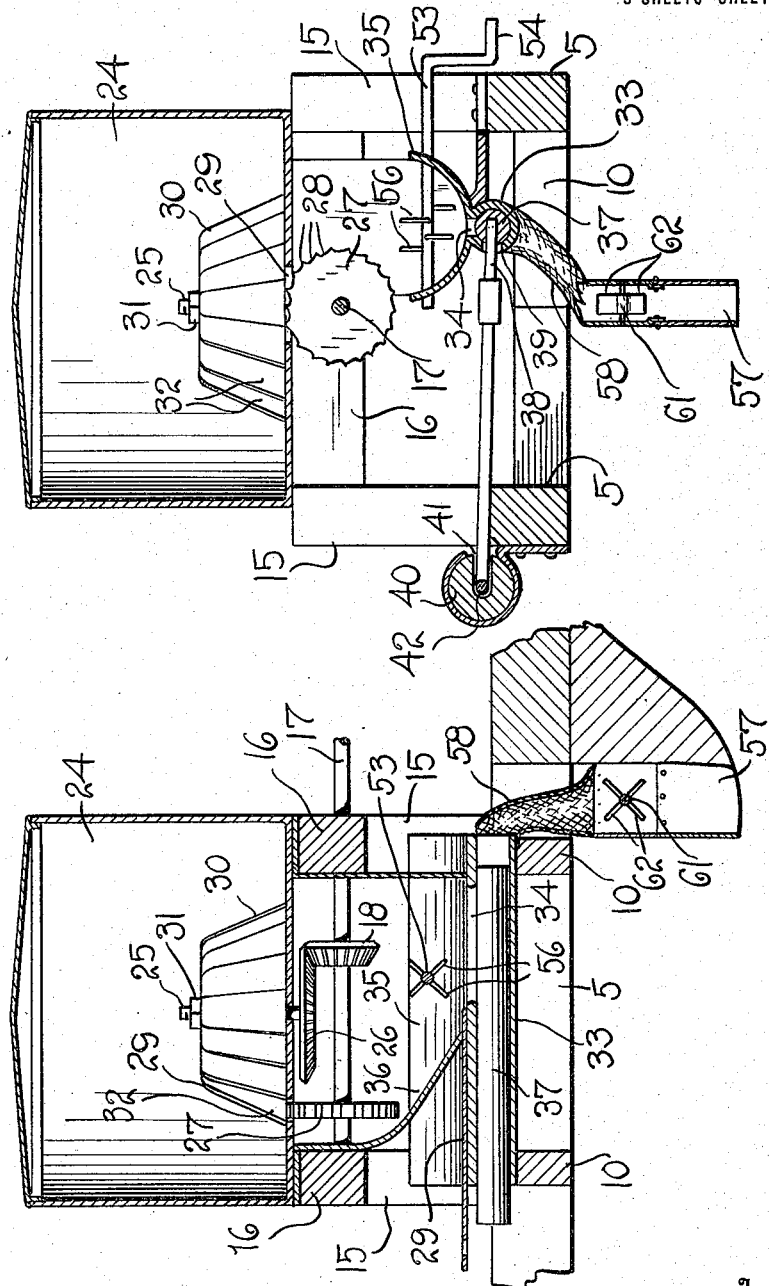

UNITED STATES PATENT OFFICE.

SAM HILL, OF BELEN, MISSISSIPPI.

PLANTER.

1,174,419.
Specification of Letters Patent.
Patented Mar. 7, 1916.

Application filed March 29, 1915. Serial No. 17,868.

*To all whom it may concern:*

Be it known that I, SAM HILL, a citizen of the United States, residing at Belen, in the county of Quitman and State of Mississippi, have invented certain new and useful Improvements in Planters, of which the following is a specification, reference being had to the accompanying drawings.

This invention relates to planters, and more particularly to a one-horse planter for planting or depositing corn or cotton seed in equidistantly spaced drills.

The invention has for one of its more important objects to provide improved means for automatically feeding the seed to the depositing boot as the machine is drawn over the field.

It is a further object of my invention to provide an improved adjustable valve plate whereby the feed of the seed to a reciprocatory discharging element which discharges the same into the depositing boot may be regulated.

The invention has for another of its objects to provide improved means for varying the depth of the planting of the seed.

The invention has for an additional general object to improve and simplify the construction of machines of the above character whereby the planting operation is greatly facilitated with a minimum of labor.

With the above and other objects in view, my invention consists in the novel features of construction, combination, and arrangement of parts to be hereinafter more fully described, claimed, and illustrated in the accompanying drawings, in which, Figure 1 is a side elevation of a planting machine constructed in accordance with the preferred embodiment of my invention; Fig. 2 is a top plan view thereof; Fig. 3 is a section taken on the line 3—3 of Fig. 2; Fig. 4 is a longitudinal section taken on the line 4—4 of Fig. 2; Fig. 5 is an enlarged top plan view of the feed hopper for the seed, the cover or top being removed; and Fig. 6 is a perspective view of the rotatable feeding disk arranged in said hopper.

Referring in detail to the drawings, 5 designates the parallel longitudinal frame bars of the machine, the forward ends of which are inwardly extended toward each other and securely bolted together, as at 6. Between the forward extremities of these bars, the ground wheel 7 is fixed upon a transverse shaft or axle 8 journaled in the frame bars. The forward end of the frame is equipped with a suitable attachment indicated at 9 for the connection of a draft animal thereto. The longitudinal bars 5 of the frame are also connected and braced at intervals by the transverse bars 10.

In the rear ends of the bars 5, the ends of a crank axle 11 are journaled, one end of this axle being extended to constitute a lever or arm 12, and upon the crank of the axle, the supporting wheel 13 is loosely mounted. The lever or arm 12 is provided with a suitable spring pressed dog for engagement with the teeth of a substantially semi-circular rack 14 which is fixed upon one of the bars 5. It will be readily understood that, by simply shifting this lever, the supporting wheel 13 may be raised or lowered and the frame swung upon the forward wheel axle 7. The purpose of this adjustment will be hereinafter particularly pointed out.

Upon the bars 5 of the machine frame, spaced uprights 15 are suitably mounted, the corresponding uprights on the bars 5 being connected by the transverse bars 16. In these bars 16, a longitudinally extending shaft 17 is rotatably mounted, and upon the same, a gear wheel 18 is fixed. A pinion 19 is also secured upon the forward end of the shaft 17 and meshes with the bevel gear 20 fixed upon a transverse shaft 21 which is mounted in suitable bearings upon the upper ends of the additional standards 22 fixed upon the frame of the machine. One end of this shaft 21 is provided with a belt wheel which is connected by the endless belt 23 with a similar wheel fixed upon one end of the ground wheel shaft 8. Upon the transversely disposed bars 16, the feed hopper 24 is secured. A vertical shaft 25 is centrally mounted in the bottom of said hopper and provided upon its lower end with a gear 26 with which the gear 18 on the shaft 17 is engaged. Upon the shaft 17 the seed receiving disk 27 is fixed, said disk being provided in its periphery with spaced grooves indicated at 28, to receive the seed. This disk extends upwardly through a slot 29 in the bottom wall of the hopper 24. Upon the shaft 25 in said hopper, a feeding disk 30 is arranged and secured by means of the nuts 31. This disk is of inverted cup-shape form and is provided in its marginal wall with a plurality of pockets 32 which, in the rotation of the disk, are adapted to receive the seed and carry the same over the slot 29, whereby the seed are delivered to the peripheral grooves of the disk 27.

Upon the transverse frame bars 10, a longitudinally extending tube or cylinder 33 is secured at its ends and the top wall of said cylinder is provided with a longitudinally extending slot 34. A trough or receiving hopper 35 is mounted above the cylinder 33 and also provided with a slot in its base which is disposed in coinciding relation with the slot 34 in the wall of said cylinder. 36 designates a forwardly curved or inclined directing plate which is fixed upon one of the transverse bars 15. Upon this plate, the seed are deposited from the disk 27 and directed forwardly into and through the slot 34. Within the cylinder 33, a longitudinally reciprocating plunger 37 is arranged. To the plunger, one end of a transversely disposed rod 38 is fixed, said rod projecting through a second longitudinal slot 39 in the cylinder 33. The outer end of this rod is movable in the slot 41 in the wall of a cylinder 40 which is fixed upon one of the longitudinal frame bars 5 of the machine. A piston 42 reciprocates in this cylinder and to the same, this outer end of the rod 38 is secured. The piston rod 43, projecting beyond one end of the cylinder 40, is provided with a depending arm 44 which is loosely engaged for sliding engagement upon a longitudinally disposed rod 45. Upon a bearing post or standard 46, mounted on the frame bar 5, a shaft 47 is journaled, and the outer end of said shaft is provided with a crank arm 48. A connecting rod 49 has one of its ends connected to this crank and its other end pivotally connected to the outer end of the piston rod 43. Upon the inner end of the shaft 47, a pulley or sprocket wheel 50 is fixed and is traversed by an endless belt or chain 51 which is also engaged with a belt wheel or sprocket 52 which is secured upon the transversely disposed shaft 21.

A shaft 53 is mounted in the side walls of the trough or receiving hopper 35 and is provided upon its outer end with a crank 54 to which one end of a rod 55 is connected, the other end of said rod being eccentrically connected to the belt wheel on the end of the shaft 21. The shaft 53 is provided with a plurality of radially disposed agitating blades or fingers 56 which engage the seed as it is delivered to the trough 35 and agitate and separate the seed so that they will readily flow into the cylinder 33.

To the frame of the machine, the depending support 57 of the usual form, is suitably secured at its upper end, the lower end of said support being provided with a suitable shoe whereby the furrow is formed in the ground in the movement of the machine. To this shoe, the lower end of a depositing boot 58 is connected, the upper end of said boot being disposed below the forward end of the tube or cylinder 33. For the purpose of regulating the quantity of seed entering the cylinder 33, I provide an adjustable plate 59 which is slidable longitudinally in the base of the trough 35 over the slot therein. The rapidity of reciprocation of the longitudinally movable plunger 37 may also be varied and regulated by employing a plurality of sprocket or belt wheels 50 of various diameters.

In the frame of the machine, immediately in advance of the wheel 13, spaced covering plows 60 are suitably mounted. These plows direct the earth inwardly upon the seed which have been deposited in the spaced hills, and the wheel 13 acts as a covering wheel, the periphery thereof being transversely concave so that it will compress or pack the earth upon the seed.

In the seed depositing boot 58, a wheel 61 is preferably mounted to rotate and is provided with a plurality of peripheral blades 62. This wheel is rotated by the falling seed engaging these blades and the blades operate to scatter the seed so that the grains will be deposited in spaced relation to each other in the furrow.

From the foregoing description, taken in connection with the accompanying drawings, the construction, manner of operation, and several advantages of my invention will be clearly and fully understood. For convenience, a tool box, indicated at 63, is preferably mounted upon the frame of the machine. The rotatable distributing disk arranged within the feed hopper 24 may be removed and a disk of different form secured upon the shaft 25, in accordance with the particular kind of seed being planted. The machine, as a whole, is strong and durable in its construction, positive and reliable in action, and greatly facilitates the proper planting of seed in spaced hills with a minimum of labor upon the part of the operator. To the rear end of the longitudinal frame bars 5, suitable handles 64 are, of course, secured, whereby the machine may be guided or directed by the operator. In the practical development of my invention, it is contemplated that various changes in the form, proportion and arrangement of the several elements may be necessary, and I, therefore, reserve the privilege of resorting to all such legitimate changes therein as may be fairly embodied within the spirit and scope of the invention as claimed.

Having thus fully described my invention, what I desire to claim and secure by Letters Patent is:—

1. In a seed planter, a seed hopper, a receiving trough arranged beneath said hopper, means for feeding the seed at intervals from the hopper into said trough, a seed depositing boot, and means including a reciprocatory element to intermittently discharge quantities of the seed into said boot.

2. In a seed planter, a hopper, a seed receiving trough arranged beneath said hopper, a cylinder disposed beneath the trough to receive the seed therefrom, means for feeding the seed at intervals from the hopper into said trough, means for directing the seed into the cylinder, a seed depositing boot, and a reciprocatory element arranged in said cylinder to intermittently discharge quantities of the seed into said boot.

3. In a seed planter, a hopper, a seed receiving trough arranged beneath said hopper, a cylinder to receive the seed from said trough, means for agitating the seed in the trough and directing the same into said cylinder, a seed depositing boot, means for varying the rapidity of flow of the seed from the trough into said cylinder, and a reciprocatory plunger arranged in said cylinder to intermittently discharge quantities of seed therefrom into the depositing boot.

4. In a seed planter, a hopper, a seed receiving trough arranged beneath said hopper, a rotatably mounted peripherally grooved disk projecting upwardly through the bottom of the hopper to receive the seed and deliver the same into said trough, means arranged within the hopper to feed the seed therein to said grooved disk, a cylinder disposed beneath said trough and adapted to receive the seed therefrom, means mounted in the trough to agitate the seed and direct the same into said cylinder, a seed depositing boot mounted in the machine frame at one end of said cylinder, a plunger to reciprocate in the cylinder and discharge quantities of the seed into the depositing boot, and means for operating said plunger and varying the speed of its reciprocation and the intervals between the discharge of the seed.

5. In a seed planter, a hopper, a trough to receive the seed from said hopper, means for feeding the seed at intervals from the hopper into said trough, a cylinder arranged beneath the trough and provided with a longitudinal slot, said trough having a slot in its base coinciding with the slot in the wall of the cylinder, an inclined blade extending into the trough to direct the seed from said slots, a plunger to reciprocate in said cylinder, a reciprocatory piston, a rod connecting said piston to the plunger whereby a quantity of seed is discharged from the cylinder into the depositing boot in the movement of the plunger in one direction, and means for operating said piston and varying the speed of its reciprocation whereby the intervals between the discharge of the seed from the cylinder may be varied.

In testimony whereof I hereunto affix my signature in the presence of two witnesses.

SAM HILL.

Witnesses:
J. W. ROBERTS, Jr.,
CLYDE BLACKMON.

Copies of this patent may be obtained for five cents each, by addressing the "Commissioner of Patents, Washington, D. C."